United States Patent Office 2,785,980
Patented Mar. 19, 1957

2,785,980

COOKING PROCESS

Ernest L. Washburn, Mundelein, Ill., assignor, by mesne assignments, to Illinois Development Laboratories, Inc., Chicago, Ill., a corporation of Illinois No Drawing. Application September 21, 1954,
Serial No. 457,561

17 Claims. (Cl. 99—88)

This invention relates to a cooking process, and has for an object the provision of a process for the preparation of toasted edible containers for frozen confections. This application is a continuation-in-part of my prior application Serial No. 257,409, filed November 20, 1951 (now abandoned).

In the art of manufacturing toasted edible containers for frozen confections, it is usually preferred to employ automatic machinery for toasting and baking the final product. However, one of the inherent difficulties with mold baking of products of this type, particularly ice cream cones, is the rigidity of the production process and the consequent limitations on the kinds and amounts of materials that may be used in the batter. For example, in automatic machinery there cannot be very much heat variation during the baking process, and the molds cannot be cooled off in one part of the cooking cycle and then heated up in another part of the cycle. Thus, if the mold temperatures are set at 350° F., for example, such temperature will be maintained throughout the baking cycle with the possible exception of the short interval directly after the batter has been run into the mold. Accordingly, it is well recognized that there are definite restrictions on the kinds and amounts of materials that may be used in formulating a satisfactory ice cream cone batter. Thus, only those ingredients which can meet the rigid machine, temperature, time and mold conditions may be employed. An important object of this invention, therefore, is the provision of a procedure which involves the pretreatment of certain of the batter ingredients in order to permit a wide degree of flexibility with respect to the kinds and amounts of ingredients that may be employed.

Also in the art of preparing edible containers for frozen confections it is desired to operate in such a manner that the final baked and toasted product will have enhanced storage characteristics, particularly when stored in an ice cream refrigerator at high humidities and at temperatures below about 10° F. In my copending application Serial No. 277,089, filed March 17, 1952, now Patent No. 2,694,012, I have disclosed an edible container which retains its tenderness and palatability under such storage conditions for long periods of time. However, under certain conditions it is desired that such products retain their crispiness under these high humidity storage conditions. Thus, it has been found that rice flour will impart a desired crispiness to products of this character, and such crispiness so imparted by the rice flour will be retained for relatively long periods under conditions of low temperature storage at high humidities. However, when batters containing rice flour are cooked on the usual commercial type machinery by prior art procedures the conditions are such that the rice flour does not cook properly and accordingly a desirable product is not formed. Likewise it is sometimes desired to modify the flavor of a product formed from the usual batter containing soft wheat flour by adding or substituting other flours, such as corn flour or oat flour. However, these flours, like rice flour, will not adequately cook in the usual kind of automatic cone baking or other molding machinery, and accordingly desirable products have not been obtained when these flours have been used. In addition, it has not been possible in commercial operations to employ hard wheat flours in commercial machines of this general type. The usual flour that is necessary is a cone flour which is a specialized type of soft wheat flour. Accordingly, a further object of this invention is the provision of a cooking process in which flours other than soft wheat flours, particularly rice flour, may be employed in the production of toasted edible containers for frozen confections.

Furthermore, in the art of manufacturing ice cream cones and other containers of this general type, it is sometimes desirable that a high concentration of sugar be incorporated into the product in order to provide a desired sweetness. However, it has been found in commercial practice utilizing automatic machinery that relatively high sugar levels have not been obtainable for the reason that the increased amount of sugar results in stickiness and carbonization of the molds in which the cones are cooked and toasted. Thus it has been practical to prepare high sugar level cones only by hand rolling methods that are not economically adapted to large scale manufacture. It is, of course, desirable from an economical viewpoint that a procedure be developed for preparing cones having a high sugar content which can be baked in molds of different shapes and which need not be shaped after baking. This is possible by employing the usual molding machinery, and the use of molds permits the production of a cone structure which contains suitable strengthening ribs and ice cream anchoring means that are not so readily formed by hand rolling methods. A serious limitation with respect to machine-made products is that, if sugar is present in the batter in excess of about 7% by weight, dry basis, the batter has a tendency to stick in the molds and to carbonize during the cooking process. This results in considerable loss of efficiency because of rejects and because the equipment has to be shut down periodically in order that the molds may be cleaned. Accordingly, it is a further object of this invention to provide a process which permits of the incorporation of sugar into a mold batter in amounts in excess of 7% and up to about 30% by weight on a dry basis without adversely affecting the cooking procedure carried out on high speed automatic machines.

An additional object of this invention is the provision of a process for making a high sugar cone which has an increased sweetness which will be more noticeable to the consumer because the sugar has a decreased tendency to wash away from the taste buds when the cone is being eaten.

A still further object of this invention is the provision of a process for making a toasted edible container for ice cream which may be readily cooked in automatic cone-making machines without distortion and with a minimum tendency to stick or carbonize in the molds.

Further and additional objects will appear from the following description and the appended claims.

In accordance with one embodiment of this invention there has been devised a process of preparing an edible container which includes the preliminary step of precooking a mixture of water and at least a portion of the cereal flour to be used in the batter. The precooked mixture may be utilized in the preparation of the usual cone batter, which is then subjected to the usual cooking and toasting operations in confined molds to form a bakery product which may be an ice cream cone. It has been found in accordance with this invention that if a mixture of the cereal flour and water is subjected to a precooking operation for a time sufficient substantially to gelatinize the starch contained in the flour, then the cooked mixture is extremely useful as an ingredient of the usual type cone batter. Thus, in the case of rice, oat, corn, or hard wheat flours, the precooking step is useful in insuring that all of the flour of the final product is adequately cooked, thereby eliminating the carry-over of any raw taste into the final product, and thereby also improving the forming characteristics in the mold. In addition, the precooking of the rice flour and the use of the precooked material as a supplement in a batter prepared from soft wheat flour results in a final product which has a crispness which will be maintained for a substantial period of time even under conditions of high humidity at ice cream storage temperatures below 10° F. In compositions of this type it is often desirable to include a gelatinous material in the final product in order to increase the tenderness and palatability of the product, all as set forth in my copending application Serial No. 277,089, now Patent No. 2,694,012.

In accordance with another preferred embodiment of this invention there has been devised a process of incorporating sugar into a cone batter which includes the preliminary step of cooking a mixture of sugar, water and a cereal flour. The cooked mixture may be utilized in the preparation of the usual cone batter, which is then subjected to the usual baking and toasting operation to form a bakery product which may be an ice cream cone. It has been discovered, in accordance with this embodiment of the invention, that if sugar is cooked with a cereal flour, particularly oat flour, the cooked mixture may be a vehicle for carrying the sugar into the usual type of cooking batter. When the sugar is incorporated in this manner it has been found that the amount of sugar in the cone batter can be raised to levels far above those heretofore obtained without resulting in a batter which will stick or carbonize when used in high speed cone-making equipment. In accordance with this aspect of this invention, it is preferred that the ratio of sugar to oat flour in the aqueous mixture to be cooked ranges between 1 to 2 and about 2 to 1. Any convenient amount of water may be present in the mixture undergoing cooking so long as enough is present to permit proper gelatinization. Also the precooking may be carried out at atmospheric or superatmospheric pressure. However, the mixture of sugar, oats and water should be cooked for a time and at a temperature sufficient to permit the gelatinization of substantially all of the oat flour present. Failure to thoroughly cook the oat-sugar product will result in a stickier and less satisfactory final cone batter. At 212° F. the cooking will usually be complete in about 1¾ hours. It will be apparent, however, that lesser times may be involved in the event that higher temperatures are employed under superatmospheric pressure, or that more water is added to the mixture.

For a more complete understanding of this invention reference will now be made to several specific examples which are given by way of illustration but not by way of limiting the scope of the herein disclosed invention.

*Example 1*

One pound of rice flour was cooked at atmospheric pressure in a Baker-Perkins steam-jacketed kettle for a period of about 35 minutes in the presence of 1300 cc. of water. This cooking resulted in a gelatinization of the starch in the rice flour and the mixture was then thinned with 600 cc. of water in order to facilitate subsequent mixing operations. As second mixture was then prepared by kneading 1½ pounds of soft wheat flour with 13.5 grams of cane sugar, 9.0 grams of salt, 2.0 grams of Sucaryl (sweetening agent—Abbot Laboratories), 9.0 grams of egg albumin, 9.0 grams of milk powder and 550 cc. of water. After kneading for 2½ minutes, one half of the precooked rice-water mixture was added to the second mixture and the resulting mass was further kneaded until smooth. Then 100 cc. more of water was added, along with 25 grams of shortening. The resulting batter was flowable and was pumped into the molds of an automatic cone-making machine. The molds were maintained at a temperature of about 350° F. and the baking cycle was approximately 2 minutes. The resulting cone was crisp and this crispness persisted for a period of over six days, even when stored under ice cream storage conditions at 6° F. If desired, gelatinizing agents, such as gelatin, carboxymethyl cellulose, methyl cellulose and/or agar, may be incorporated into the batter prior to baking in order to increase the tenderness and palatability of the resulting product upon storage under the conditions previously indicated. The proportion of rice to soft wheat flour in the foregoing formulation is 1 to 3. This proportion gives a product having desired crispness which will persist even under high humidity conditions. However, satisfactory crispness persistency may be obtained if the proportion of rice to soft wheat flour is as low as about 1 to 9.

It will be apparent from the foregoing that corn flour, oat flour or hard wheat flour may be substituted wholly or in part for the rice flour. In each case the precooking operation prevents such flours from appearing in the final product in the uncooked raw state while imparting desired and characteristic flavor properties of the final product.

*Example 2*

Five hundred parts by weight of full fat oat flour were mixed with 700 parts by weight of granulated cane sugar in a Baker-Perkins steam-jacketed mixer. Heat was then applied to the mixer by introducing 20 pounds of steam into the jacket and water was added slowly in small increments with stirring in order to prevent lumping. The water was added at such a rate that 1500 parts by weight had been added at the end of about 15 minutes. After this amount of water had been added, the mixture was cooked in the covered but unsealed mixer with stirring at approximately 212° F. for a period of 1 hour 45 minutes. At this stage the oat flour had completely gelatinized and the viscosity was somewhat past its peak. After the cooking had been completed an additional 700 parts by weight of water were added in order to facilitate the removal of the cooked mass from the mixer. Thereafter the cooked mixture of oats, sugar and water was ready to be used with the other conventional ingredients in the preparation of an ice cream cone batter, these ingredients being, for example, wheat flour, tapioca, soda, shortening, artificial flavor and coloring, salt, etc.

In order to prepare a cone batter from the above indicated cooked mixture of sugar, oat flour and water, 285 pounds of cold water were flowed into a mixture. While stirring there was added about 16 ounces of artificial coloring, about 10 to 12 pounds of tapioca flour, about ½ pound of salt, about ½ pound of baking soda and about ½ pound of vanilla extract. Thereafter 150 pounds of the cooked oat-sugar slurry prepared as described above were added to the water solution. Thereafter 200 pounds of soft wheat (cone) flour were added slowly and the entire mixture was beaten for a period of approximately 2½ minutes in order to form a uniform batter. Thereafter about 2 to 4 pounds of hydrogenated vegetable shortening were added to the batter while the beating was continued for about another ½ minute.

The resulting batter was a rather viscous but flowable mixture which could be readily pumped and flowed to suitable automatic cone-baking equipment. This equipment is well known to the art and need not be described in detail here. Suffice it to say that the batter was introduced into the hot molds in the usual manner and the molds were closed and the individual cones were formed, cooked and toasted at a mold temperature between 325° and 350° F. for a period of about 1½ minutes. The cones when taken from the molds did not have a tendency to stick and there was no carbonization even though the percentage of sugar in the batter on a dry basis was in the neighborhood of 13 percent. A cone batter having the same formula indicated above, with granulated sugar being added in the conventional manner, would not be satisfactory for use in commercial operations if the amount of sugar exceeded 7 or 8 percent by weight (dry basis) because of cone distortion, stickiness and tendency to carbonize during cooking and toasting.

Thus, in accordance with one embodiment of this invention, a cone has been produced that is much sweeter than the prior art cones produced in automatic cone-making machinery and containing only about 7 percent of sugar. In addition the high sugar level cones produced in accordance with the process of this invention are well formed and the batter does not have a tendency to stick or carbonize in the mold. The cones also have a pleasing sweetness which persists in the mouth of the consumer for longer periods than is usual with prior art cones.

As indicated in the foregoing, the cereal flour with which the sugar is cooked is preferably oat flour. However, it is within the contemplation of this invention that a portion or all of the oat flour may be substituted by other gelatinizable cereal flours, such as flours of rice, wheat, barley, corn and the like. For example, a satisfactory sugar vehicle was prepared by cooking a mixture of 600 parts of granulated sugar, 300 parts of brown sugar, 500 parts of full fat oat flour and 50 parts of rice with 1500 parts of water. In such a formulation, the rice flour, as indicated above, imparts a desired crispness to the final product.

No attempt is here made to explain the reason for the improved results observed when that aspect of the process of this invention relating to high sugar cones is employed. It is presently believed, however, that the cereal flour, such as oats, when heated with the sugar in the presence of water results in the formation of a loose chemical or physico-chemical bond between the oats and the sugar so that the resulting composition does not have a tendency to stick or carbonize when the final batter is cooked and toasted in the usual manner. This theory of a bond between the oats and the sugar seems to be borne out by the observation that the effectiveness of the cooked mixture appears to be reduced somewhat after it has stood for a long period of time before or after adding to the batter as above described.

Inasmuch as an important aspect of an embodiment of this invention is to incorporate a high percentage of sugar into a cone batter, it is important that the mixture of oat flour and sugar to be cooked contain a relatively high percentage of sugar. On the other hand, there should be sufficient oats in the mixture to be cooked in order to give the desired results. Thus it is generally preferred that the ratio of oat flour to sugar in the mixture to be cooked be within the range of about 2 to 1 and about 1 to 2.

While it is usually preferred in the cone-making art to employ granulated sugar (sucrose) in the manufacture of the cone batter, other types of sugar may be substituted in whole or in part if desired. Thus a percentage of the granulated sugar may be replaced by brown sugar. On the other hand, it is not usually so desirable to employ syrups or other sugar hydrates or derivatives, such as cerelose, since these materials have a tendency to impart an excessively sticky property to the final batter which is not desired, particularly where automatic machinery is involved.

Thus in one aspect of this invention there has been disclosed a process of incorporating sugar into a cone batter which is at levels that have not heretofore been feasible in the operation of automatic cone-making machinery. This invention permits of the high speed economical production of high sugar level cones with a minimum of sticking, distortion and carbonization. This result has been made possible by incorporating substantially all of the sugar into the cone batter in the form of a heat reaction product of water, a cereal flour such as oat flour, and sugar.

*Example 3*

One and one-half pounds of corn flour were mixed with 1200 cc. of water and cooked in a steam-jacketed and sealed Baker-Perkins mixer for one hour under 10 pounds internal pressure maximum. The pressure was then released and the dough was thinned with 1500 cc. of water in order to facilitate handling. A second mixture was then prepared by kneading 1½ pounds of soft wheat flour with 45 grams of cane sugar, 4.5 grams of salt, 4.5 grams of milk powder, 4.5 grams of vanilla powder and 550 cc. of water. After kneading for 2½ minutes, one third of the precooked corn-water mixture was added to the second mixture and the resulting mass was kneaded until smooth. After kneading, the mixed batch was further diluted with 550 cc. of water, and 9.0 grams of hydrogenated vegetable oil shortening were added. The resulting flowable mass was pumped to the molds of an automatic cone-making machine in which the individual cones were cooked in confined molds at 350° F. for about two minutes. The resulting cone had a smooth caky taste, and the corn flour therein was thoroughly cooked. Prior art corn-flour-containing products are essentially heavy and tough, while the product of this example was light in weight and had smooth eating qualities.

The foregoing examples demonstrate the value of the broader aspects of this invention, i. e., precooking at least a portion of certain flours until substantial gelatinization of the starch therein has occurred prior to passing the flowable batter into an automatic cone-making machine. The over-all process is particularly applicable in a process where certain flours, other than soft wheat flours, are to be used either wholly or in part. It is particularly suitable for use with rice where it is desirable to produce a product having the desired crispness. It is also particularly suitable for use under conditions where it is desired to form a high-sugar product or where an improved product utilizing corn flour is desired. The invention has primary application in the art of making containers for frozen confections, e. g., ice cream cones, which are normally prepared by cooking and toasting a batter of the character previously described in confining molds at a temperature between 275° and 425° F. for a period of one to four minutes.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process of preparing a substantially dry and edible container for a frozen confection which comprises precooking a mixture of a cereal flour and water for a time sufficient substantially to gelatinize the starch in said cereal flour; thereafter flowing the resulting mixture as a batter into a confining mold, and baking and toasting said batter in said mold to form said container.

2. The process recited in claim 1 wherein said baking and toasting step is carried out at a temperature between about 275° and 425° F. for between about one and four minutes.

3. A process of preparing a substantially dry and edible container for a frozen confection which comprises precooking a mixture of a cereal flour and water for a time sufficient substantially to gelatinize the starch in said cereal flour, thereafter admixing the cooked mixture with a soft wheat flour to form a flowable batter, flowing said batter to a confining mold and baking and toasting said batter in said mold to form said container.

4. The process recited in claim 3 wherein said cereal flour is rice.

5. The process recited in claim 3 wherein said cereal flour is oats.

6. The process recited in claim 3 wherein said cereal flour is corn.

7. The process recited in claim 3 wherein said cereal flour is hard wheat.

8. A process of preparing a substantially dry and toasted edible container for a frozen confection characterized by its ability to retain crispness upon storage at low temperatures and high humidities which comprises precooking a mixture of rice flour and water for a time sufficient substantially to gelatinize the starch in said flour, thereafter admixing the cooked mixture with wheat flour to form a flowable batter, flowing said batter to a confining mold, and baking and toasting said batter in said mold for between about one and four minutes at between about 275° and 425° F. to form said container.

9. A process of preparing a substantially dry and edible container for a frozen confection having a high sugar content which comprises cooking a mixture of sugar, water and an oat flour for a time sufficient to gelatinize the starch in said oat flour, thereafter flowing the cooked mixture as a batter having a high sugar content into a confining mold, and baking and toasting said batter in said mold.

10. A process of preparing a substantially dry and toasted edible container for a frozen confection having a high sugar content which comprises cooking a mixture of sugar, water and a cereal flour for a time sufficient to gelatinize the starch in said flour, thereafter admixing the cooked mixture with an uncooked flour and water to form a batter having a sugar content in excess of about 7 percent by weight (dry basis), introducing said batter into a confining mold, baking and toasting said batter in said mold to form said container, and removing said substantially dry container from the mold.

11. A process of preparing a substantially dry and toasted edible container for a frozen confection having a high sugar content in excess of about 7 percent by weight (dry basis) which comprises cooking a mixture of water, oat flour and substantially all of the sugar to be incorporated into the final product for a time sufficient to gelatinize the starch in said oat flour, thereafter admixing the cooked mixture with an uncooked wheat flour and water to form a batter having a sugar content in excess of about 7 percent by weight (dry basis), introducing said batter into a confining mold, baking and toasting said batter in said mold to form said container, and removing said substantially dry container from the mold.

12. A process of preparing a substantially dry, baked and toasted edible cereal container for a frozen confection having a high sucrose content which comprises cooking a mixture of water, oat flour and sucrose for a time sufficient to gelatinize the starch in said oat flour, the weight ratio of said oat flour to said sucrose being between about 2 to 1 and about 1 to 2, admixing the cooked mixture with water and an uncooked wheat flour, the amount of sucrose in the resulting mass being greater than about 7 percent by weight (dry basis), forming a smooth batter from said mass, flowing said batter into a confining mold, baking and toasting said batter in said mold to form said container, and removing said substantially dry container from the mold.

13. A process of preparing a substantially dry, baked and toasted edible cereal container for a frozen confection having a high sucrose content which comprises cooking a mixture of water, oat flour and substantially all of the sucrose to be incorporated into the final product for a time sufficient to gelatinize the starch in said oat flour, the weight ratio of said oat flour to said sucrose being between about 2 to 1 and about 1 to 2, thereafter thoroughly admixing the cooked mixture with water and an uncooked wheat flour to form a batter having a sucrose content in excess of about 7 percent by weight (dry basis) and having a higher percentage of wheat flour than oat flour, flowing said batter into a hot confining mold, baking and toasting said batter in said mold to form said container, and removing said substantially dry container from said mold.

14. A process of preparing a substantially dry and edible container for a frozen confection which comprises precooking a mixture of a cereal flour and water for a time sufficient substantially to gelatinize the starch in said cereal flour, thereafter admixing the cooked mixture with a soft wheat flour to form a batter, introducing said batter to a confining mold and baking and toasting said batter in said mold to form said container.

15. A process of preparing a substantially dry and toasted edible container for a frozen confection characterized by its ability to retain crispness upon storage at low temperatures and high humidities which comprises precooking a mixture of rice flour and water for a time sufficient substantially to gelatinize the starch in said flour, thereafter admixing the cooked mixture with wheat flour to form a batter, introducing said batter to a confining mold, and baking and toasting said batter in said mold for between about one and four minutes at between about 275° and 425° F. to form said container.

16. A process of preparing a substantially dry and edible container for a frozen food confection which comprises preparing a batter from a precooked gelatinized cereal flour and water, introducing said batter into a confining mold, and baking and toasting said batter in said mold to form said container.

17. A process of preparing a substantially dry and edible container for a frozen confection which comprises preparing a batter containing a precooked gelatinized cereal flour, a soft wheat flour and water, introducing said batter into a confining mold, and baking and toasting said batter in said mold to form said container.

References Cited in the file of this patent

UNITED STATES PATENTS

| | | |
|---|---|---|
| 1,923,684 | Perky | Aug. 22, 1933 |
| 2,011,050 | Greenwood | Aug. 13, 1935 |
| 2,406,585 | Buchanan | Aug. 27, 1946 |
| 2,466,261 | Musher | Apr. 5, 1949 |